United States Patent Office 3,554,924
Patented Jan. 12, 1971

---

3,554,924
RARE EARTH METAL HALIDES WITH ORGANOALUMINUMS AS OLEFIN REACTION CATALYSTS
Edmund T. Kittleman and Ernest A. Zuech, Bartlesville, Okla., assignors to Phillips Petroleum Company, a corporation of Delaware
No Drawing. Continuation-in-part of application Ser. No. 635,676, May 3, 1967. This application Jan. 2, 1968, Ser. No. 694,874
Int. Cl. C07c *3/00;* B01j *11/78*
U.S. Cl. 252—429                                9 Claims

ABSTRACT OF THE DISCLOSURE

A catalyst active for the olefin reaction including olefin disproportionation comprising a rare earth metal halide (e.g. $SmCl_3$) combined with an organoaluminum compound (e.g., ethylaluminum dichloride).

---

This application is a continuation-in-part of copending application Ser. No. 635,676, filed May 3, 1967, now abandoned.

This invention relates to the conversion of olefin hydrocarbons and to a catalyst for such conversion. In one aspect this invention relates to the olefin reaction. In another aspect it relates to the conversion of olefins to other olefins having different molecular weights. In still another aspect it relates to a novel catalyst.

The term olefin reaction, as used herein, is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between the first and second carbon atoms and between third and fourth carbon atoms, respectively, and the formation of two new unsaturated bonds. Said first and second carbon atoms and said third and fourth carbon atoms can be in the same or different molecules.

The olefin reaction according to this invention is illustrated by the following reactions:

(1) The disproportionation of an acylic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyene; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclooctene and 2-pentene yields 2,10-tridecadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene and continued reaction can produce higher molecular weight materials.

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

New catalytic processes have been discovered in recent years for the conversion of olefins to other olefin products including products of both higher and lower molecular weight whereby olefins of relatively low value are converted into olefins of increased value. Such conversions have heretofore been carried out at relatively high temperatures using catalysts comprising compounds such as compounds of molybdenum or tungsten and generally associated with materials such as alumina or silica. It has now been found that these olefin conversions can be carried out at relatively low temperatures using as catalysts halides of rare earth metals having atomic numbers from 58 to 70 inclusive in combination with suitable aluminum-containing catalytic adjuvants to produce solid materials, for example rubber suitable for the manufacture of tires, wire coating, footwear and other industrial products.

It is an object of this invention to provide a method and a catalyst system for the conversion of olefin hydrocarbons. It is also an object of this invention to provide a catalyst system comprising a halide or a rare earth metal having an atomic number from 58 to 70 inclusive and an aluminum-containing catalytic adjuvant having activity for the olefin reaction. Still another object is to provide a method for converting olefins into other olefins having both higher and lower numbers of carbon atoms. Other aspects, objects and advantages of the invention will become apparent to one skilled in the art upon study of this disclosure including the detailed description of the invention.

According to the process of this invention, cyclic and acyclic olefins, preferably internal non-tertiary olefins, and mixtures of these, including mixtures with ethylene, are converted into other olefins by contact with a catalyst system which forms by the admixture, under catalyst forming conditions, of components comprising (a) a rare earth halide represented by the formula $MX_n$ wherein M is a metal having an atomic number from 58 to 70 inclusive, X is a halogen and $n$ is 2, 3, or 4, with (b) a catalytic adjuvant comprising a compound represented by the formula
   (1) $R_aAlX_b$, or
   (2) a mixture of (1) compounds, or
   (3) a mixture of one or more $AlX_3$ or $R_aAlX_b$ compounds with one or more compounds represented by the formula $$R_c^1M^1X_d$$

wherein each R is a saturated aliphatic or aromatic organic radical having up to 20 carbon atoms including halogen and alkoxy substituted radicals, preferably an alkyl radical having up to 10 carbon atoms; each X is a halogen; each $M^1$ is a metal of Group I–A, II–A, or III–A; each $R^1$ is selected from hydrogen or R; $a$ is 1, 2, or 3; $b$ is 0, 1, or 2; the sum of $a$ and $b$ is 3; $c$ is 1, 2, or 3; $d$ is 0, 1, or 2; and the sum of $c$ and $d$ is equal to the valence of $M^1$; and when acyclic olefins are converted and the adjuvant is (1), $b$ is preferably 1 or 2.

Some examples of compounds of (1) and (2) are methylaluminum dichloride, dimethylaluminum chloride, methylaluminum sesquichloride, ethylaluminum dichloride, ethylaluminum sesquichloride, di-(2-ethylhexyl)aluminum bromide, phenylaluminum dichloride, di(3-ethoxypropyl)aluminum bromide, benzylaluminum dibromide, dieicosylaluminum bromide, and the like and mixtures thereof.

Some examples of the $R_c^1M^1X_d$ compounds are phenyllithium, methylsodium, lithium hydride, lithium aluminum hydride, lithium borohydride, diethylzinc, dipropylzinc, or triethylaluminum, trieicosylaluminum, di(12-chlorododecyl) aluminum chloride, and the like, and mixtures thereof. Preferred (b) components of the catalyst system are the (1) or (2) adjuvants.

The elements referred to herein are in accordance with the Periodic Table of Elements appearing in Handbook of Chemistry and Physics, Chemical Rubber Company, 45th edition (1964).

Some examples of the rare earth catalyst component (a) are: $CeF_4$, $CeBr_3$, $CeCl_3$, $CeF_3$, $CeI_3$, $PrCl_3$, $NdCl_3$, $PmCl_3$, $SmCl_3$, $EuBr_2$, $GdI_3$, $TbI_3$, $TbCl_4$, $DyCl_3$, $HoF_3$, $HoBr_3$, $ErCl_3$, $ErF_3$, $TmCl_3$, $TmBr_2$, $YbCl_3$, and $YbI_3$.

The molar proportion of the (a) component and of the (b) component, to form the catalyst system of the present invention, will generally be in the broad range of from about 0.1 to about 20 or more, preferably from about 1 to about 15 moles of the (b) aluminum-containing catalyst component (b) for each mole of the rare earth halide component (a).

The catalyst is prepared simply by combining the (a) component and the (b) component under conditions of time and temperature which permit the catalytically active reaction product to be formed. This combination occurs readily and, in general, the components can be mixed at any convenient temperature; however, excessively high temperatures at which some of the components tend to decompose or excessively low temperatures at which some of the components tend to crystallize or otherwise tend to become unreactive, should be avoided. The mixing will preferably be carried out at a temperature within the range of −80 to about 75° C., more preferably from about 0 to about 40° C. for a few seconds to 24 hours in the presence of an inert diluent in which both the components are at least partially soluble. Halogenated hydrocarbon diluents, such as chlorobenzene, methylene chloride, carbon tetrachloride, o-dichlorobenzene, and the like, are presently preferred. The mixing of the two catalyst components is carried out in the substantial absence of air or moisture, generally in an inert atmosphere.

After the catalytic reaction mixture is formed, it need not be isolated but can be added directly to the olefin reaction zone as a dispersion in its preparation diluent. If desired, the catalyst components can be separately added, in any order, to the reaction zone either in the presence or absence of the feed olefin.

Olefins applicable for use in the process of the invention are nontertiary, nonconjugated acyclic mono- and polyenes having at leas 3 carbon atoms per molecule including cycloalkyl, cycloalkenyl, and aryl derivatives thereof; cyclic and polycyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule. Nontertiary olefins are those olefins wherein each carbon atom, which is attached to another carbon atom by means of a double bond, is also attached to at least one hydrogen atom. Internal olefins are preferred.

Some specific examples of acyclic olefins suitable for reactions of this invention include propylene, 1-butene, 2-butene, 1-pentene, 2-pentene, 1-hexene, 1,4-hexadiene, 2-heptene, 1-octene, 2,5-octadiene, 2-nonene 1-dodecene, 2-tetradecene, 1-hexadecene, 1-phenylbutene-2, 4-octene, 3-eicosene, 3-hexene, 1,4-pentadien, 1,4,7-dodecatriene, 2-methyl-4-octane, 4-vinylcyclohexane, 1,7-octadiene, 1,5-eicosadiene 2-triacontene, 2,6-dodecadiene, 1,4,7,10,13-octadecapentaene 8-cyclopentyl - 4,5 - dimethyl-1-decene, 6,6-dimethyl-1,4-octadiene, and 3-heptene, and the like, and mixtures thereof.

Some specific examples of cyclic olefins suitable for the reactions of this invention are cyclobutene,
cyclopentene,
cycloheptene,
cyclooctene,
5-n-propylcyclooctene,
cyclodecene,
cyclododecene,
3,3,5,5-tetramethylcyclononene,
3,4,5,6,7-pentaethylcyclodecene,
1,5-cyclooctadiene
1,5,9-cyclododecatriene,
1,4,7,10-cyclododecatetraene,
6-methyl-6-ethylcyclooctadiene-1,4, and the like, and mixtures thereof.

It will be understood by those skilled in the art that not all olefinic materials will be converted by the present invention with equal effectiveness. The reactions described in the present invention are equilibrium-limited reactions and, barring the selective removal of one or more products from the reaction zone, the extent of conversion will depend upon the thermodynamics of the specific system observed. Thus, conversion of olefinic materials to give specific products can be thermodynamically favored while the reverse reaction is very slow and ineffective. For example, 1,7-octadiene is converted to equilibrium-favored products such as cyclohexene and ethylene. The reverse reaction of ethylene and cyclohexene, correspondingly, goes very poorly. Other well-known factors, such as steric hindrance in bulky molecules, significantly and sometimes drastically affect the rates of reaction of some olefins such that extremely long reaction times are required.

The reaction of symmetrical monoolefins with themselves, to give different olefin products, will sometimes proceed very slowly, requiring some double bond migration to take place before the reaction will proceed at a significant rate. For the same reason, the conversion of a mixture of ethylene and a 1-olefin for example can be more difficult than the conversion of ethylene with an internal olefin, some double bond isomerization also being required in this instance.

It has also been found that branching also retards the olefin reactivity in proportion to its propinquity to the reacting double bond. Analogously, the presence of inert polar substituents on the olefinic compound appears tolerable only if located some distance from the double bond.

Thus, the present invention is directed primarily to the conversion of those olefins or combination of olefins which are capable of undergoing the olefin reaction to a significant degree when contacted with the catalyst of the present invention under reaction conditions suitable for effecting the olefin reaction.

Presently preferred olefinic feed compounds are those contained in the following classes:

(1) Internal acyclic monoolefins, including those with aryl, cycloalkyl, or cycloalkenyl substituents, having 4–20 carbon atoms per molecule with no branching closer than about the 3-position and no quaternary carbon atoms or aromatic substitution closer than the 4-position to the double bond, and mixtures of such unsubstituted acyclic internal monoolefins. Some examples of these are: butene-2, pentene-2, hexene-2, hexene-3, octene-4, nonene-2, 4-methylpentene-2, decane-3, 8-ethyldecene-2, dodecene-4, eicosene-5, and the like.

(2) Acyclic, nonconjugated polyenes having from 7 to about 20 carbon atoms per molecule, containing from 2 to about 4 internal double bonds per molecule and having at least one double bond with no branching nearer than the 3-position and no quarternary carbon atom nearer than the 4-position to that double bond, or mixtures of such polyenes. Some examples are: 2,5-heptadiene, 2,6-octadiene, 4-methyloctadiene-2,6, 3,6,9-dodecatriene, and the like.

(3) Cyclopentene.

(4) Monocyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to the double bond, and mixtures of such olefins including mixtures with cyclopentene. Some examples are: cycloheptene, cyclooctene, 4-methylcyclooctene, 3-methyl-5-ethylcyclodecene, cyclononene, cyclododecene, norbornene, and the like.

(5) A mixture of one or more of the monocyclic olefins of (4) with one or more unsubstituted acyclic internal monoolefins (1). Some examples of these are: hexene-3 and cycloheptene, butene-2 and cyclooctene, butene-2 and cyclodecene, pentene-2 and cyclooctene, heptene-3 and cyclodecene, and the like.

(6) Monocyclic and bicyclic polyenes having from 5 to about 12 ring carbon atoms, including those substituted with up to 3 alkyl groups having up to about 5 carbon atoms each, having at least one double bond with no branching closer than the 3-position and with no quarternary carbon atoms closer than the 4-position to that double bond, and mixtures thereof. Some examples of these are: 1,5-cyclooctadiene, 1,5,9-cyclododecatriene, 1,4-cycloheptadiene, norbornadiene, and the like.

(7) A mixture of one or more monocyclic polyenes of (6) with one or more of the unsubstituted acyclic internal olefins of (1). Some examples of these are: 1,5-cyclooctadiene and butene-2, 1,5,9-cyclododecatriene and butene-2, 1,5,9-cyclododecatriene and pentene-2, and the like.

(8) Polar group-subtsituted olefinic compounds of classes (1) through (7) containing from 6 to about 20 carbon atoms per molecule in which the polar group, such as a halogen atom, is sufficiently removed from the active double bond (generally no nearer to the double bond than the 5-position) so as not to interfere with the reaction, and mixtures with unsubstituted members of class (1). Some examples are: 7-chlorooctene-2, and the like.

According to the process of the invention, the olefin or mixture of olefins to be converted is contacted with the catalyst system at any convenient temperature, avoiding excessively high or excessively low temperatures as described above. The mixing will preferably be carried out at a temperature within the range of from about −30 to about 75° C., more preferably from about 0 to about 40° C. and at any convenient pressure which is sufficient to maintain a liquid phase. The conversion can be carried out in the presence or absence of a diluent, but a diluent is generally preferred. Any inert diluent can be used, hydrocarbons and halogenated hydrocarbons generally being suitable.

Suitable diluents include benzene, cyclohexane, tetrahydrofuran, methylene chloride, chlorobenzene, xylene, isooctane, and the like.

The time of contact will depend on the desired degree of conversion and the specific catalysts and olefins utilized, but will generally be in the range of from 0.1 to about 100 hours. The proportion of catalyst composition to olefin feed in the reaction zone will generally be in the range of from about 0.001 to 100 millimoles of rare earth metal for each mole of olefin in the reaction zone.

Any conventional contacting technique can be used for the olefin conversion, and batchwise or continuous operation can be utilized. After the reaction period, the products can be separated and/or isolated by any conventional means such as by fractionation, crystallization, adsorption and the like. Unconverted feed material or products not in the desired molecular weight range can be recycled to the reaction zone. If desired, the catalyst can be destroyed by treatment with water or alcohol in an amount sufficient to deactivate the catalyst prior to the separation of products. Otherwise, after separation of the products, the catalyst can be recycled to the reaction zone.

The invention can be further illustrated by the following examples.

EXAMPLE I

Disproportionation of heptene-2 over $SmCl_3$/methylaluminum sesquichloride

Into a dry 7-ounce pressure bottle was charged about 0.2 g. of $SmCl_3$, 9 ml. chlorobenzene, 5 ml. heptene-2, and about 1 millimole of methylaluminum sesquichloride in 1 ml. of chlorobenzene. The mixture was stirred for 2 hours at 0° C. and then allowed to stand at room temperature for about 90 hours. Gas-liquid chromatographic analysis of the reaction mixture showed the presence of 0.7 weight percent butene, 1.8 weight percent decenes, and 97.5 weight percent heptenes.

EXAMPLE II

Disproportionation of pentene-2 over $SmCl_3$/ethylaluminum dichloride

In a manner similar to that of Example I, about 0.2 g. of anhydrous $SmCl_3$, 10 ml. of chlorobenzene, 5 ml. pentene-2, and 0.2 g. ethylaluminum dichloride were charged into the reaction bottle. The mixture was maintained at room temperature for about 90 hours. The analysis of the mixture then showed that it contained 1.1 weight percent butenes, 1.5 weight percent hexene, and 97.4 weight percent pentene-2, thus illustrating that the catalyst system was active for disproportionation.

In the practice of the process of the invention the feed olefins, catalysts and operating conditions disclosed include combinations wherein solid, rubbery materials are produced; for example, if a propylene feed and a suitable aluminum-containing adjuvant such as an organo aluminum dihalide or an organo aluminum sesquihalide are used, a solid, rubbery material is produced having characteristics of ethylene-propylene rubber. This rubbery material is useful in the manufacture of tires, wire coating, footwear and other industrial products.

The homogeneous catalysts of this invention can be deposited upon a suitable support or carrier and used in the olefin reaction, preferably where the olefin feed is in the vapor phase. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, and the like.

The support can be impregnated with the homogeneous catalyst by wetting the support with a solution of the catalyst in a solvent which is then evaporated. Among solvents suitable are relatively low-boiling organic solvents such as pentane, methylene chloride, cyclohexane, and the like. The amount of homogeneous catalyst added to the support will be from 0.1 to about 30 weight percent of the total of the catalyst and support. If the support is to be activated by calcination, it is usually activated prior to the impregnation step.

Impregnation and evaporation conditions in preparing the catalyst are conventional, being carried out at temperatures up to about 150° C. Operating conditions in carrying out the olefin reaction are the same for the supported and the nonsupported homogeneous catalyst systems.

That which is claimed is:
1. A composition consisting essentially of an admixture of
   (a) a halide of a metal having an atomic member from 58 to 70, inclusive, and
   (b) an aluminum adjuvant represented by the formula
      (1) $R_aAlX_b$,
      (2) a mixture of (1) compounds; or
      (3) a mixture of one or more (1) compounds or a compound of the formula $AlX_3$ with one or more compounds represented by the formula $$R_c^1 M^1 X_d$$

wherein each R is a saturated aliphatic or aromatic hydrocarbon radical having up to 20 carbon atoms; each X is a halogen; each $M^1$ is a metal of Group I–A, II–A or III–A; each $R^1$ is hydrogen or R; $a$ is an integer from 1 to 2; $b$ is an integer from 1 to 2; the sum of $a$ and $b$ is 3; $c$ is an integer from 1 to 3; $d$ is 0 or an integer from 1 to 2; and the sum of $c$ and $d$ is equal to the valence of $M^1$; and wherein the molar proportions of (b) to (a) are in the range of from about 0.1:1 to about 20:1.

2. The composition of claim 1 wherein the second component (b) is an adjuvant represented by the formula
   (1) $R_aAlX_b$, or
   (2) a mixture of (1) compounds.

3. The composition of claim 2 wherein the metal halide is samarium trichloride.

4. The composition of claim 1 which further includes an inert diluent in which both of the (a) and (b) components are at least partially soluble.

5. The composition of claim 4 wherein the inert diluent is a halogenated hydrocarbon selected from the group consisting of chlorobenzene, methylene chloride, carbon tetrachloride, and o-dichlorobenzene.

6. The composition of claim 4 wherein the (a) component is combined with the (b) component at a temperature range of about −80 to about 75° C. for a few seconds to about 24 hours in an inert atmosphere.

7. The composition of claim 1 further including a solid inorganic or organic support or carrier selected from the group consisting of silica, alumina, silica-alumina, titania, boria, zeolites, ion exchange resins, a solid polymer of 4-vinylpyridine and a solid polymer of vinyl dimethylphosphine.

8. The composition of claim 1 wherein $SmCl_3$ is admixed with methylaluminum sesquichloride.

9. The composition of claim 1 wherein $SmCl_3$ is admixed with ethylaluminum dichloride.

References Cited
UNITED STATES PATENTS

| | | | |
|---|---|---|---|
| 2,953,531 | 9/1960 | Anderson et al. | 252—429(A) |
| 3,068,180 | 12/1962 | Van Amerongen et al. | 252—429(A) |
| 3,098,844 | 7/1963 | Polishuk | 252—429(A)X |
| 3,111,511 | 11/1963 | Stickney | 252—429(A)X |
| 3,152,088 | 10/1964 | Sandri et al. | 252—429(B) |
| 3,179,647 | 4/1965 | Mulley et al. | 252—429(A)X |
| 3,303,239 | 2/1967 | Cleary et al. | 252—429(B)X |

PATRICK P. GARVIN, Primary Examiner

U.S. Cl. X.R.

252—442; 260—680, 683, 666